May 30, 1967  D. D. SEELY, JR  3,321,836
RULER

Filed Aug. 2, 1965

INVENTOR.
DOUGLAS D. SEELY, JR.
BY M. A. Hobbs
ATTORNEY

United States Patent Office 3,321,836
Patented May 30, 1967

3,321,836
RULER
Douglas D. Seely, Jr., 802 Odd Fellows Bldg.,
South Bend, Ind. 46601
Filed Aug. 2, 1965, Ser. No. 476,628
8 Claims. (Cl. 33—107)

The present invention relates to rulers and more particularly to a multiple scale ruler.

The conventional multiple scale ruler consists of a body of triangular cross scetional shape, each face having four scales, with two of the scales superposed over one another on each edge. While this type of ruler contains a relatively large number of scales with respect to its overall size, it is often difficult and inconvenient to use, since in changing from one scale to another, it may be necessary to rotate the body both from one face to another and from end to end in order to place the desired scale in usable position on the drawing board or paper. Likewise, in view of the triangular shape of the conventional multiple scale rule, it is somewhat difficult to handle or manipulate in locating the desired scale and placing it in position for use, and, for the same reason, is inconvenient to carry on the person or in a brief or carrying case. Further, in certain specilized fields it is helpful to have a conversion table or other information readily available to use in making measurements and layouts, along with the various scales on the ruler, and to have the scales clearly identified in a convenient, easy to read location on the ruler. It is therefore one of the principal objects of the present invention to provide a multiple scale which is easy to handle and manipulate in placing the ruler on and removing it from a drafting board or paper, and in finding and positioning the desired scale for making measurements and layouts on the paper or tracing cloth, and which is relatively compact and flat and easily carried on the person or in briefcases and the like.

Another object is to provide a ruler having a relatively large number of scales, any one of which can be quickly moved into proper position for use and thereafter effectively read, and measurements accurately made, and which is of such design and construction that the scales, when not in use, and their supporting structure do not interfere with the effective use of the scale being used.

A further object of the invention is to provide a multiple scale ruler having a plurality of adjustable scales containing members of relatively simple construction and operation, and having the basic appearance of a simple ruler with only a pair of scales, the additional scales being readily and conveniently available though concealed when not in use.

Still another object of the invention is to provide a multiple scale ruler of the aforesaid type which is sturdy in construction and which can be readily and economically produced from easily fabricated and assembled parts and which can be effectively repaired and serviced if necessary to give long satisfactory operation.

Additional objects and advantages of the present invention will become apparent from the following description and accompanying drawings, wherein.

Figure 2:
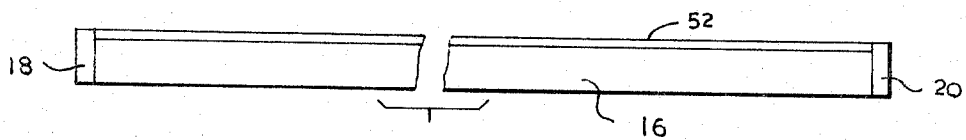
FIGURE 2 is a side elevational view of the ruler shown in FIGURE 1.
Figure 3:
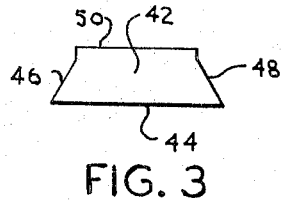
FIGURE 3 is an end elevational view of the present ruler.

Referring more specifically to the drawings, numeral 10 designates generally the present rule, consisting of an elongated body 12 and scale members 14 and 16 rotatably mounted on body 12 by end members 18 and 20, the two end members being rigidly secured to the respective ends of the body 12. The rotatable scale members 14 and 16 are provided with the scales normally contained on the conventional multiple scale ruler previously referred to herein, and a single scale may be on a single face of each scale member, or two scales may be on each face in the same manner as on the conventional scale. Further, if desired, each face may contain two scales along each edge, thus providing a total of twelve scales on each scale member and twenty-four scales on the entire ruler. Normally, however, each face would contain only two scales along the edge of the face in readable position when the face is exposed as illustrated with the ruler in the position shown in FIGURES 1, 2 and 3. The arrangement of the scales may be varied in accordance with the technical field in which the ruler is intended to be used.

Figure 4:
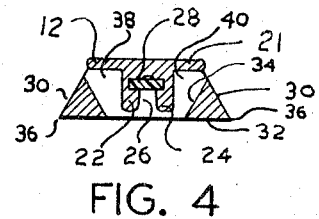
FIGURE 4 is a vertical cross sectional view of the ruler shown in the preceding figures, the section being taken on line 4—4 of FIGURE 1.
Figure 5:
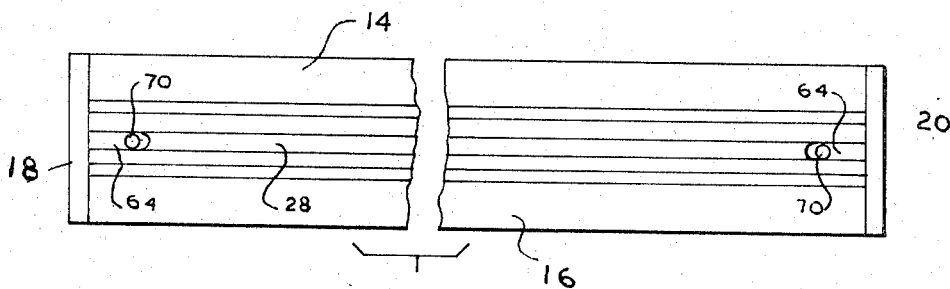
FIGURE 5 is a bottom elevational view of the ruler.
Figure 6:
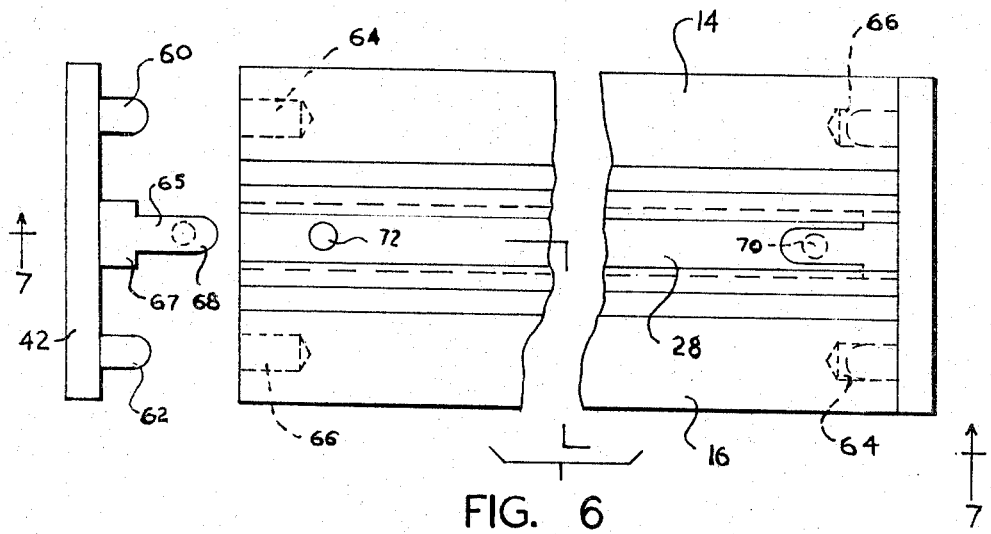
FIGURE 6 is an enlarged partially exploded view of the ruler with a section broken away to reduce the size of the figure.
Figure 7:
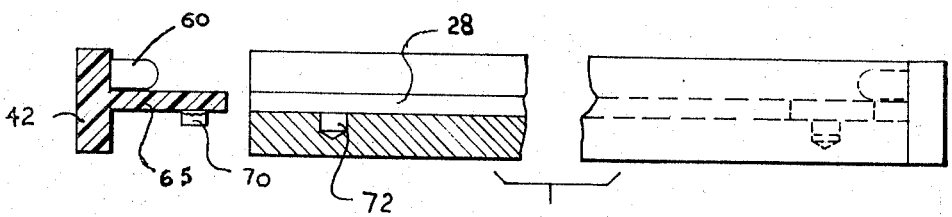
FIGURE 7 is a partial cross sectional and side elevational view of the exploded view shown in FIGURE 6, the section being taken on line 7—7 of FIGURE 6.

The body 12 consists of a modified T-shaped cross sectional configuration having a flat upper portion 21 and two downwardly extending longitudinal members 22 and 24 forming a downwardly facing groove 26, as can be effectively seen in FIGURE 4. The sides of the groove are tapered slightly inwardly and upwardly and the groove is provided with an enlarged laterally extending groove portion 28, extending throughout the entire length of body 12. The body configuration shown in the drawings can readily be extruded into long lengths, and thereafter cut into the lengths desired for the ruler, and the body may be of any suitable material, such as aluminum or plastic.

The scale members 14 and 16 are triangular in cross section with all three faces 30, 32 and 34 of equal size, with sharp corners 36 between the respective adjoining faces. The two scale members are rotatably mounted on body 12 in the respective recesses 38 and 40 by end members 18 and 20 with the horizontal portions of the T-shaped body extending over said scales. The two end members, which are identical in construction, consist of a plate 42 having a flat bottom surface 44 and upwardly and inwardly tapered edges 46 and 48 at the same angle as the exposed surfaces of members 14 and 16. The flat bottom surface 44 forms, in effect, a seat or support for giving lateral support to the body and two rotating scale members. Upper surface 50 is flat and on a plane with the flat upper surface 52 of body 12. The end members are provided with pins 60 and 62, preferably formed integrally with plate 42 and adapted to seat in holes 64 and 66 in opposite ends of each of the scale members, thus rotatably mounting the scale members on the body 12.

The end members are rigidly secured to the ends of the body by a tongue 65, preferably formed integrally with plate 42 and projecting laterally therefrom into groove portion 28. The inner end 67 of tongue 65 is broadened to correspond substantially to the width of groove portion 28, and seats firmly in the groove, holding the end members firmly in place on the end of the body. The forward end of the tongue 68 is provided with a lug 70 for seating in a recess or hole 72 in the bottom of groove portion 28. It is thus seen that when the tongue 65 is pressed into groove portion 28 until plate 42 engages the end of the body, lug 70 snaps into and seats firmly in hole 72, thus locking the end member in place on the end of the body. The lug 70 and recess 72 form interlocking shoulders, and can be of different shapes and arrangements, including interchanging the lug and recess with respect to the tongue and groove. When the end members are assembled on the body in the foregoing manner, pins 60 and 62 are seated in holes 64 and 66 of scale members 14 and 16, thus rotatably mounting the two scales in recesses 38 and 40 along the respective sides of body 12. The end members are held firmly in place and will not be subject to accidental dislodging from the ends of the body; however, they may readily be removed from the body by using an instrument to lift the forward end 68 of tongue 65 upwardly sufficiently to disengage lug 70 from hole 72. While the tongue is held in this position, the end can easily be slipped away from the end of body 12 until the tongue has been fully removed from grooved portion 28.

Figure 1:
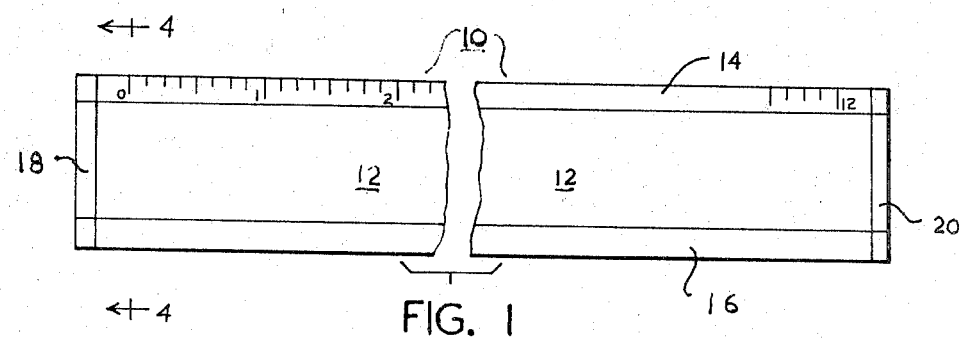
FIGURE 1 is a top plan view of the present multiple scale ruler with a portion broken away and with only two visible scales partially shown.

In fabricating the present multiple scale rule, the body 12 is preferably extruded from aluminum and cut into the desired lengths, usually approximately six or twelve inches long. The ends 18 and 20 are preferably fabricated from plastic material, such as nylon, and the scale members are preferably extruded from aluminum and the body and scale members are enameled or otherwise coated. The scales are silk-screened onto the three faces of the scale members, and the holes 64 and 66 are drilled in the two ends. The five parts can then readily be assembled by merely placing pins 60 and 62 of the two end members in holes 64 and 66 and pressing tongue 65 into grooved portion 28 until lug 70 seats in recess 72. After the rule has been asembled in the foregoing manner, it is used by placing it on a drawing board with the desired scale showing on the side facing away from the draftsman, thus permitting the draftsman to observe conveniently and effectively the scale, as illustrated in FIGURE 1. The rule can be easily lifted with one or both hands by grasping the longitudinal edges of the T-shaped body. When it is desired to change the scale, the scale member containing the desired scale is rotated until the face containing the scale is exposed.

In the event the scale members contain scales along each edge of each face, the scale can be inverted and placed in an angular position with edges 46 and 48 of the end members forming the support, thereby to permit the additional scale to be placed with its lower edge on the drafting board or paper. With this arrangement, the ruler may contain as many as twenty-four different scales, twelve of which may be easily read with the ruler in the position illustrated in FIGURES 1 through 4, and the remaining twelve with the scale in the angular position resting on end edges 46 or 48.

While only one embodiment of the present invention has been described in detail herein, various changes and modifications may be made without departing from the scope of the invention.

I claim:
1. A multiple scale ruler, comprising an elongated body of T-shaped cross section forming a flat upper surface and two laterally disposed longitudinal recesses extending the full length of said body, said body having a center groove extending the full length thereof with an enlarged inner portion, a recess in the bottom of said groove disposed near each end and spaced inwardly from the respective end, scale members of triangular cross sectional shape rotatably mounted on said body along each of said laterally disposed recesses and having a hole in each end, a member at each end of said body, each end member having pins extending into the holes in the ends of said scale members for rotatably supporting said scale members, and a tongue on each end member extending into said enlarged inner portion of said groove and having a lug thereon for seating in the respective recess in the bottom of said groove securing said member to the end of said body.

2. A multiple scale ruler, comprising an elongated body of T-shaped cross section forming two laterally disposed longitudinal recesses extending the full length of said body, said body having a center groove with an enlarged inner portion, two spaced recesses in said groove, scale members of triangular cross sectional shape rotatably mounted on said body along each of said laterally disposed recesses and having a hole in each end, a member at each end of said body, each end member having pins extending into the holes in the ends of said scale members for rotatably supporting said scale members, and a tongue on each end member extending into said enlarged inner portion of said groove and having a lug thereon for seating in the respective recess in said groove securing said member to the end of said body.

3. A multiple scale ruler, comprising an elongated body of T-shaped cross section forming a flat upper surface and two laterally disposed longitudinal recesses extending the full length of said body, said body having a center groove extending the full length thereof, a recess in the bottom of said groove disposed near each end and spaced inwardly from the respective end, scale members of triangular cross sectional shape rotatably mounted on said body along each of said laterally disposed recesses and having a hole in each end, a member at each end of said body, each end member having pins extending into the holes in the ends of said scale members for rotatably supporting said scale members, and a tongue on each end member extending into said center groove and having a lug thereon for seating in the respective recess in the bottom of said groove securing said member to the end of said body.

4. A multiple scale ruler, comprising an elongated body of T-shaped cross section forming two laterally disposed longitudinal recesses extending the full length of said body, said body having a center groove having an enlarged inner portion, two spaced recesses in said groove, scale members of triangular cross sectional shape rotatably mounted on said body along each of said laterally disposed recesses and having a hole in each end, a member at each end of said body, each end member having means for rotatably supporting said scale members, and a tongue extending into said enlarged inner portion of said groove and having a lug thereon for seating in the respective recess in said groove securing said member to the end of said body.

5. A multiple scale ruler, comprising an elongated body of T-shaped cross section forming two laterally disposed longitudinal recesses, said body having a longitudinal groove, two spaced shoulders in said groove, scale members mounted on said body along each of said laterally disposed recesses and having a hole in each end, a member at each end of said body, each end member having means for rotatably supporting said scale members, and a tongue on each end member extending into said longitudinal groove and having a shoulder thereon for engaging the respective shoulder in said groove securing said member to the end of said body.

6. A multiple scale ruler, comprising an elongated body of T-shaped cross section having a longitudinal groove with open ends, two spaced shoulders in said groove, scale members mounted on said body along each side of said body, a member at each end of said body, each end member having means for rotatably supporting said scale members, and a tongue on each end member extending into said longitudinal groove and having a shoulder thereon for engaging the respective shoulder in said groove securing said member to the end of said body.

7. A multiple scale ruler, comprising an elongated body of T-shaped cross section forming two laterally disposed longitudinal recesses, said body having a center groove extending the full length thereof, scale members mounted on said body within said recesses with the horizontal portions of said T-shaped body extending over said scales, a member at each end of said body, each end member having means for rotatably supporting said scale members, and a tongue on each end member extending into said center groove and having means for securing said member to the end of said body.

8. A multiple scale ruler, comprising a body of T-shaped cross section forming two laterally disposed longitudinal recesses, scale members rotatably mounted on said body along each side of said body within said laterally disposed recesses with the horizontal portions of said T-shaped body extending over said scales, a member at each end of said body, each end member rotatably supporting said scale members, and means for securing each member to the respective end of said body.

References Cited

UNITED STATES PATENTS 418,968  1/1890  Benzinger et al. _____ 33—107

FOREIGN PATENTS 588,472  6/1947  Great Britain.
601,823  6/1948  Great Britain.

LEONARD FORMAN, *Primary Examiner.*

H. N. HAROIAN, *Examiner.*